United States Patent [19]

Stephens

[11] Patent Number: 5,570,866
[45] Date of Patent: Nov. 5, 1996

[54] SEAT SUSPENSION

[75] Inventor: Donald L. Stephens, La Conner, Wash.

[73] Assignee: Paccar Inc, Bellevue, Wash.

[21] Appl. No.: 400,798

[22] Filed: Mar. 7, 1995

Related U.S. Application Data

[63] Continuation-in-part of Ser. No. 114,191, Aug. 30, 1993, abandoned.

[51] Int. Cl.$^6$ ..................................................... F16M 13/00
[52] U.S. Cl. .......................... 248/631; 248/550; 248/588; 267/117
[58] Field of Search ..................................... 248/550, 562, 248/588, 631, 636; 267/117, 121, 131, 140.11

[56] References Cited

U.S. PATENT DOCUMENTS

| | | | |
|---|---|---|---|
| 3,013,813 | 12/1961 | Kozicki | 280/124 |
| 3,028,174 | 4/1962 | Gawronski | 280/124 |
| 3,210,063 | 10/1965 | Kirsch | 267/64 |
| 3,235,221 | 2/1966 | Conner | 248/400 |
| 3,288,523 | 11/1966 | Bollden et al. | 296/65 |
| 3,298,654 | 1/1967 | Dome | 248/400 |
| 3,328,019 | 6/1967 | Wilson | 267/11 |
| 3,350,086 | 10/1967 | Decker | 267/1 |
| 3,486,417 | 12/1969 | Di Vita et al. | 91/216 |
| 3,632,077 | 1/1972 | Hall et al. | 248/400 |
| 3,712,603 | 1/1973 | Hickinbotham | 267/131 |
| 3,994,469 | 11/1976 | Swenson et al. | 248/400 |
| 4,090,580 | 5/1978 | McLennan | 180/103 BF |
| 4,148,518 | 4/1979 | Vilbeuf | 296/65 |
| 4,159,106 | 6/1979 | Nyman | 267/64 B |
| 4,359,867 | 11/1982 | Swanson | 60/413 |
| 4,363,377 | 12/1982 | Van Gerpen | 180/282 |
| 4,461,444 | 7/1984 | Grassl et al. | 248/550 |
| 4,469,010 | 9/1984 | Skover, Jr. et al. | 91/408 |
| 4,638,982 | 1/1987 | Misher et al. | 267/131 |
| 4,729,538 | 3/1988 | Bergacker et al. | 248/550 |
| 4,844,428 | 7/1989 | Margolis et al. | 267/64.21 |
| 4,941,648 | 7/1990 | Kimura | 267/131 |
| 5,004,206 | 4/1991 | Anderson | 267/131 |
| 5,062,497 | 11/1991 | Ogata | 180/300 |
| 5,242,158 | 9/1993 | Robic et al. | 267/140 |
| 5,297,769 | 3/1994 | Le Fol et al. | 248/550 |

FOREIGN PATENT DOCUMENTS

| | | | |
|---|---|---|---|
| 0002332 | 6/1979 | European Pat. Off. | B60N 1/00 |
| 1944185 | 9/1970 | Germany | B60N 1/02 |

*Primary Examiner*—Ramon O. Ramirez
*Assistant Examiner*—Richard M. Smith
*Attorney, Agent, or Firm*—Seed and Berry LLP

[57] ABSTRACT

Disclosed is a shock absorbing suspension system supporting a seat on a floor of a vehicle. The suspension system includes a hydraulic bag filled with a liquid and coupled to support the seat on the floor, the hydraulic bag having a valve orifice. The suspension system also includes a reservoir partially filled with liquid, having a lower orifice, an upper orifice, and a baffle positioned adjacent the lower orifice to impede the liquid from escaping through the upper orifice. An adjustable valve has an internal passageway communicating with the hydraulic bag via its valve orifice and the reservoir via its lower orifice to allow the liquid from the hydraulic bag to pass into the reservoir. The passageway can be made sufficiently small to dampen motion of the seat toward and away from the floor. The reservoir includes a supply of gas in direct communication with the liquid, the gas being compressed when the liquid enters the reservoir through the valve, thereby providing a spring. Gravity keeps the gas above the liquid in the reservoir and out of the valve without requiring a diaphragm to maintain gas/liquid separation. In one embodiment, a vent line connects a vent orifice of the hydraulic bag with a vent orifice of the reservoir to allow gas to escape from the hydraulic bag to the reservoir.

37 Claims, 5 Drawing Sheets

SEAT SUSPENSION

CROSS-REFERENCE TO RELATED APPLICATION

This application is a continuation-in-part of U.S. Pat. application Ser. No. 08/114,191, filed Aug. 30, 1993, which is now abandoned.

TECHNICAL FIELD

The present invention relates to vehicle suspension systems, and more particularly, to adjustable shock absorbing suspension systems for a vehicle seat.

BACKGROUND OF THE INVENTION

A suspension system is often used to support and isolate a load, such as a cab or driver's seat, on a truck frame. The vibration environment of the truck frame is an important part of the problem of providing a good vibration isolator. Providing vibration isolation on a truck frame is quite different than providing a wheel suspension system to isolate the frame itself from road disturbances.

The wheel suspension system must accommodate occasional large motions at high speed, such as might be caused by driving over a chuckhole. Because of this, the wheel suspension damper (shock absorber) itself must allow these occasional large high speed displacements without generating large loads that might damage the suspension system or the vehicle itself. In general, since most shock absorbers are built for wheel suspension system use, they embody features that allow these large rapid motions.

On a truck frame, however, matters are different. Chuck holes do not result in large, rapid displacements at the frame, for the wheel suspension system largely isolates those disturbances from the frame. The actual vibrations on the frame, to a first approximation, correspond to a constant acceleration at different frequencies. That is, for a given road and vehicle speed, the spectral distribution of vibration is one of constant peak acceleration during a vibration cycle. The implication of that spectral distribution is that the peak velocity during a vibration cycle decreases linearly with increasing frequency. That is, $V_{MAX}$ is proportional to 1/FREQUENCY, where $V_{MAX}$ is the maximum velocity of the frame during a vibration cycle at a given frequency.

Consider the elements of a suspension system. They are simple: a mass supported by a spring, with a damper or shock absorber connected across the spring. This is the description of a seat suspension, a cab suspension, or a wheel suspension.

The conventional way to provide a damper for all of these suspensions is to use a shock absorber with a linear damping characteristic, with other provisions to relieve the forces from a sudden large motion. Such provisions typically are: 1) a relief valve to allow large pressures to escape, and 2) generating most of the damping action during the rebound motion, thereby allowing the shock absorber to move with little damping force when driven upward by the road. Linear damping means that the damping forces are directly proportional to the velocity; e.g., twice as fast motion generates twice the damping force. A system with linear damping behaves proportionally the same way with any amount of motion, and so is the type of damping that is considered in most system analyses, because it simplifies analysis.

The result of the mass and spring combination is that there is a frequency at which the mass will bounce freely on the spring, the natural frequency. Typically, for truck front axle suspensions, this frequency is about 2 cycles per second (Hertz). The damping is typically light, about 10 percent of the amount that is termed critical. Critical damping occurs when a disturbed mass returns to its rest position with no overshoot or oscillation at all. With light damping, any motion that excites the suspension at its natural frequency will be amplified by several times at the suspended body.

Now, consider the case of a truck with a front axle suspension with a natural frequency of 2 Hertz and a seat suspension in the cab with a natural frequency near 2 Hertz. When the front axle suspension is excited (by a big bump, for example) at its natural frequency, the truck frame bounces up and down an amount that can be several times the size of the bump, because of the amplifying effect at the natural frequency. At the same time, the seat suspension in the cab is also amplifying the motion of the frame, which is an amplified motion of the bump. The result is that the driver is often tossed violently about the cab, hitting his or her head on the ceiling and/or being stopped violently by the downward motion stop on the seat. Damage to the driver's head or back may result.

Conventional dampers (shock absorbers) have other problems. Such dampers typically employ oil-filled shock absorbers. To contain the oil, aggressive seals are used that produce excessive friction, thereby making the ride poorer. Damping adjustment is not easily accomplished, although adjustable shock absorbers have been built. Generally, the adjustment control is not convenient to the driver and the adjusted damper characteristics vary widely because of the compromised way that the adjustment is devised within the shock absorber.

SUMMARY OF THE INVENTION

An object of the present invention is to provide an inexpensive, efficiently damped suspension system for a vehicle seat.

Another object is to allow the vehicle driver full control over the damping, such that the damping can be adjusted according to the driver's weight and damping preference.

Another object is to provide damping that varies with the square of the velocity of seat motion over the full range of adjustment.

These and other objects are provided by a shock absorbing suspension system supporting a seat on a floor of a vehicle according to a preferred embodiment of the invention. The suspension system includes a hydraulic bag filled with a liquid and coupled to support the seat on the floor, the hydraulic bag having an upper orifice. The suspension system also includes a reservoir partially filled with liquid, having a lower orifice, an upper orifice, and a baffle positioned adjacent the lower orifice to impede the liquid from escaping through the upper orifice when the valve is opened. An adjustable valve supports the reservoir on the hydraulic bag and has an internal passageway communicating with the hydraulic bag via its upper orifice and the reservoir via its lower orifice to allow the liquid from the hydraulic bag to pass into the reservoir. The passageway can be made sufficiently small to dampen motion of the seat toward and away from the floor. The reservoir includes a supply of gas in direct communication with the liquid, the gas being compressed when the liquid enters the reservoir through the valve, thereby providing a spring. The reservoir is positioned above the hydraulic bag, such that gravity keeps the gas above the liquid and out of the valve without requiring a diaphragm to maintain gas/liquid separation.

In a preferred embodiment, a link mechanism extends between the seat and the floor. The link mechanism is adapted to allow the seat and floor to move toward and away from each other and to restrict lateral motion of the seat with respect to the floor. The link mechanism includes a pair of link arms pivotally connected to each other to form a pantograph structure. A support shelf is connected between the hydraulic bag and one of the link arms to support the seat on the hydraulic bag. Preferably, the support shelf is connected to a central portion of one of the link arms such that the support shelf moves vertically less than the seat with respect to the floor.

In an alternate embodiment, the reservoir is positioned beside the hydraulic bag rather than being supported by the hydraulic bag. The hydraulic bag and the reservoir each have side orifices that communicate with each other via the internal passageway of the adjustable valve. Once again, the internal passageway of the adjustable valve is sufficiently small to dampen motion of the seat toward and away from the floor. The hydraulic bag includes an upper vent orifice that commutes with a lower vent orifice of the reservoir via a vent tube. The vent orifices and the vent tube enable any gas trapped in the hydraulic bag to escape to the reservoir. The reservoir includes a supply of pressurized air directly communicating with the hydraulic fluid, such that the air vented from the hydraulic bag rises through the hydraulic fluid into the pressurized gas. Gravity keeps the gas above the liquid and out of the valve without requiring a diaphragm to maintain gas/liquid separation.

DETAILED DESCRIPTION OF THE INVENTION

The present invention is directed to a shock absorbing suspension system supporting a seat on a floor of a vehicle. The suspension system employs a hydraulic bag connected by an adjustable valve to a fluid reservoir. Damping is accomplished by providing an adjustably small passageway in the valve through which liquid escapes into the reservoir when the seat and floor are moved toward each other. The reservoir is filled with both liquid and gas such that the gas is compressed when the liquid from the hydraulic bag enters the reservoir through the valve. The gas in the reservoir directly contacts the liquid, but gravity maintains substantial separation between the liquid and gas so that no diaphragm is needed to maintain such separation. Such an arrangement of the hydraulic bag, valve, and reservoir provide a simple and inexpensive yet effective suspension system that provides damping that increases with the square of the velocity imparted to the suspension system.

Figure 1:
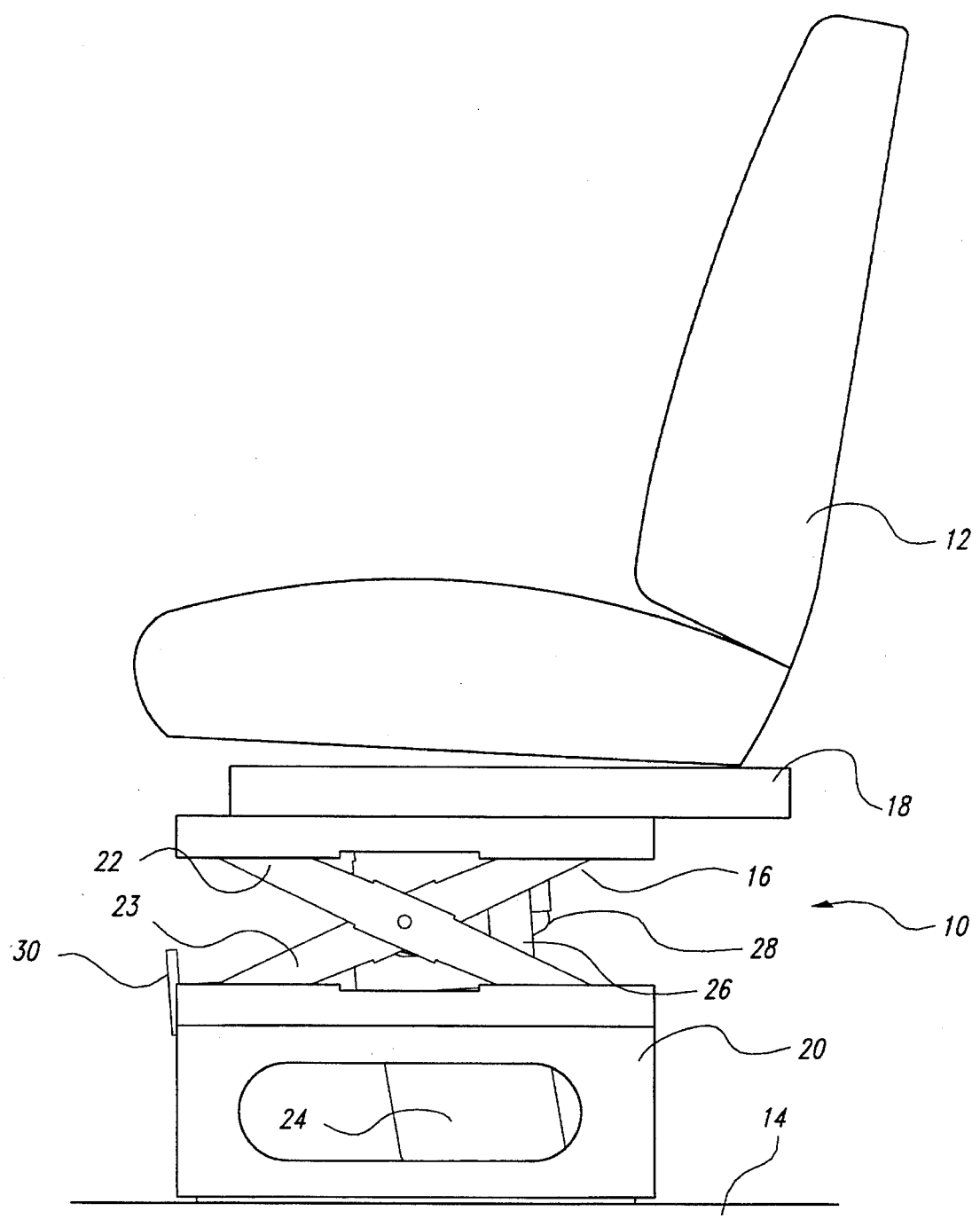
FIG. 1 is a side elevational view of a suspension system supporting a seat on a floor of a vehicle according to the present invention.

FIG. 1 is side elevational view of a seat suspension system 10 supporting a seat 12 on a floor 14 of a vehicle according to a preferred embodiment of the present invention. The suspension system 10 includes a link mechanism 16 extending between a seat base member 18 coupled to the seat 12 and a floor base member 20 coupled to the floor 14. A preferred link mechanism includes a pair of link arms 22 and 23 on the left and right sides of the seat, the link arms forming a pantograph structure as is well known. The link mechanism allows vertical motion between the seat and floor, but restrains lateral motion.

Figure 2:
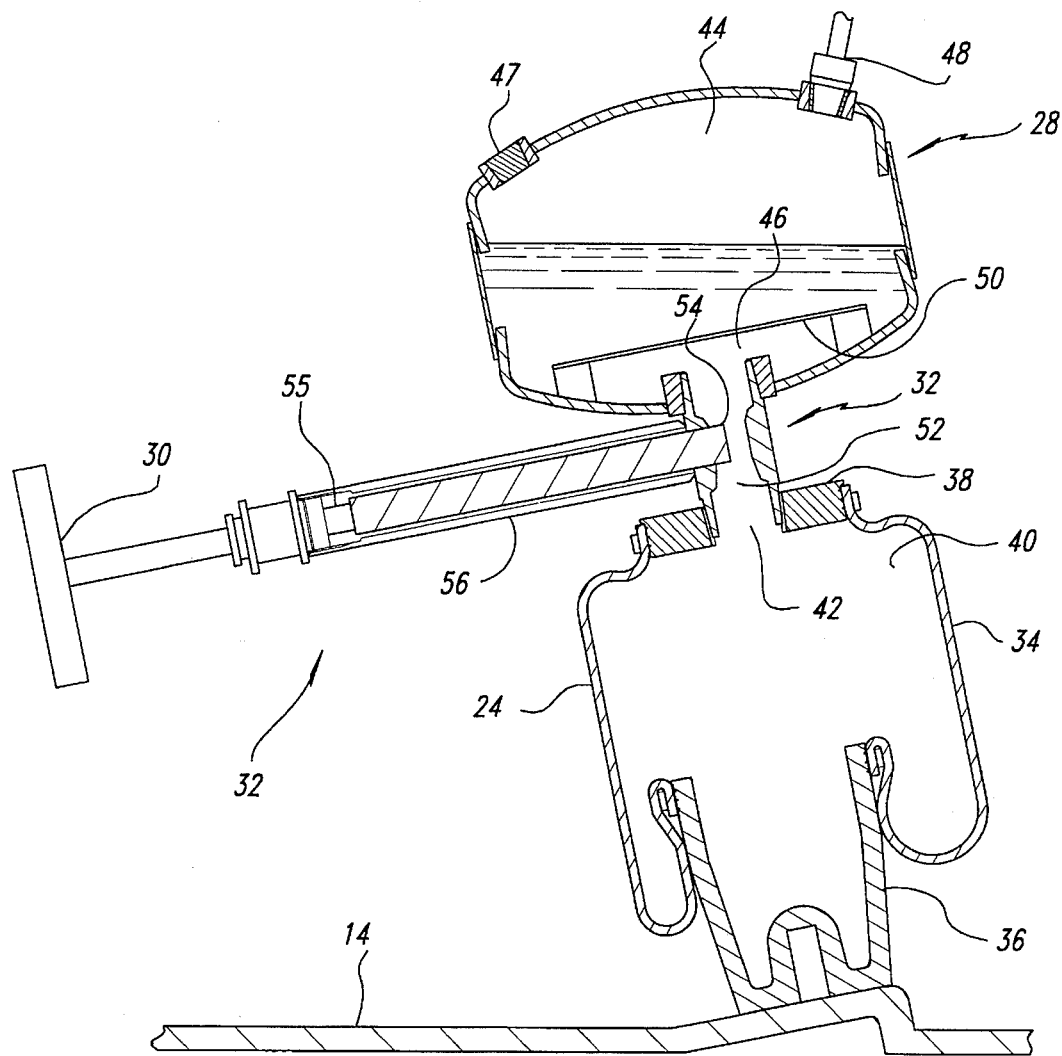
FIG. 2 is a cross-sectional view of the suspension system shown in FIG. 1, including a hydraulic bag, valve, and fluid reservoir.

The seat 12, link mechanism 16 and seat base member 18 are supported on the floor 14 by a hydraulic bag 24 connected to one or more of the link arms 23 via a U-shaped support shelf 26. The hydraulic bag can be any conventional hydraulic/air bag, such as a Firestone 7012 Airmount Isolator. The hydraulic bag 24 also supports a fluid reservoir 28 via an adjustable valve 32 (FIG. 2). The adjustable valve includes a valve control handle 30 that extends forwardly from the valve to the front of the seat for easy adjustment of the valve opening that allows fluid to communicate between the hydraulic bag and the reservoir. In contrast to prior art systems, the hydraulic bag supports the entire load without assistance from the reservoir 28.

FIG. 2 shows the hydraulic bag 24, reservoir 28, and valve 32 in cross-sectional detail. As shown, the hydraulic bag 24 includes a fabric and rubber sidewall 34 extending between a rigid base 36 and an upper end cap 38 so as to form a chamber 40 that is filled with liquid. When the seat 12 is forced downward or the floor 14 is forced upward, the hydraulic bag by base 36 compresses the chamber as the sidewall 34 rolls over the base. Because of the rolling contact of the sidewall with base, there is little Coulombic friction, and the ride is better on that account. Specifically, the Coulombic friction of conventional shock absorber seals are avoided. The upper end cap 38 includes a threaded orifice 42 to which the valve 32 is attached.

The reservoir 28 is a simple rigid tank that includes an internal chamber 44 that stores both liquid and a gas, such as air. The reservoir includes a threaded lower orifice 46 to which the valve 32 attaches with suitable mating threads. The reservoir includes an upper liquid port 47 that is closed during operation of the truck, but opened for connection to a liquid source (not shown) to add liquid to the system. The reservoir also includes an upper valve port 48 coupled to a conventional three-way valve of the truck compressed air system (not shown). The three-way valve connected to the upper valve port 48 is selectively operable in any of three positions. First, an open inlet position allows compressed air to be forced into the tank through the upper valve port to raise and position the seat. Second, an open outlet position allows air to escape from the tank to atmosphere to lower the seat. Third, a closed position, which is the normal position during operation of the truck, prevents air from escaping and allows the reservoir 28, valve 32, and hydraulic bag 24 to act as a spring as well as a damper.

Positioned within the reservoir 28 is a baffle 50 that is welded to the interior walls of the reservoir 28 at a few locations along the perimeter of the baffle. The baffle 50 is positioned above the passageway 52 in the value 32 to prevent the liquid from shooting up through the air in the reservoir, and possibly escaping through one of the ports 47, 48. The liquid hits the baffle and flows laterally until it passes upwardly along the perimeter of the baffle, thereby making hardly a ripple in the gas/liquid interface.

The valve 32 includes a passageway 52 that communicates with the hydraulic bag chamber 40 via the upper end cap opening 42 and with the reservoir chamber 44 via the reservoir lower orifice 46 to allow liquid communication between the hydraulic bag 24 and the reservoir 28. The valve of the preferred embodiment is a throttle valve having a valve head 54 extending into the valve passageway to variably restrict the size of the passageway. The valve head 54 is coupled to the valve control handle 30 by conventional means such as a threaded valve stem 55 in a valve body 56, such that rotation of the valve control handle moves the valve stem and causes the valve head to move further into or out of the valve passageway. The control handle allows a user to alter the size of the passageway, thereby altering the damping forces applied by the suspension system. Decreasing the size of the passageway creates higher damping forces for damping smaller displacements or a heavier driver while a larger passageway provides damping for situations where the displacements are larger or for a lighter driver. As a result, the control handle provides easy adjustment of the damping forces according to the vehicle driver's weight and damping preference.

Figure 3:
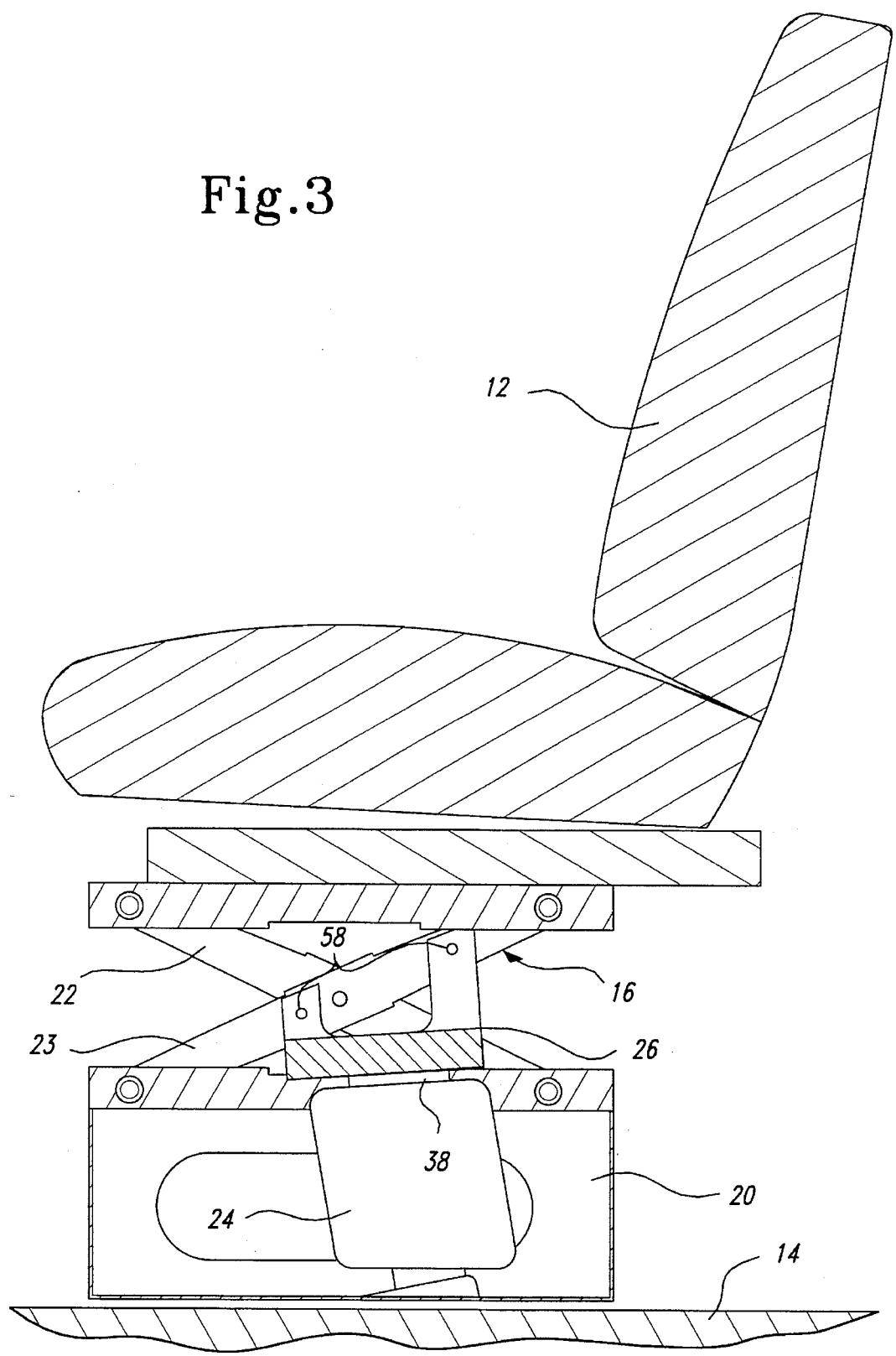
FIG. 3 is a cross-sectional view of the suspension system shown in FIG. 1, including a link mechanism, support shelf, and hydraulic bag.

FIG. 3 is a cross-sectional view of the suspension system 10 with the fluid reservoir 28 and the valve 32 removed to highlight the connection between the support shelf 26 and the link mechanism 16. The support shelf is coupled to the upper end cap 38 of the hydraulic bag 24 simply by the upward pressure of the hydraulic bag against the support shelf. The valve extends through a hole in the support shelf to laterally position the valve with respect to the hydraulic bag. Alternatively, conventional connectors, such as bolts, rivets, and welds can be used to connect the support shelf to the hydraulic bag. In addition, a connector such as a pipe clamp can be used to clamp the valve body 56 to the support shelf to retain the valve stem and valve control handle in position extending toward the front of the seat 12.

The support shelf is coupled to the central portions of one set of link arms 23 on each side of the seat by conventional connecting members, such as bolts 58 or welds, so that the support shelf and upper end cap 38 move in concert with the link arms. Because of the pantograph structure of the link arms, the central portions of the link arms move vertically half as much as the motion of the seat 12 with respect to the floor 14. By attaching the support shelf at or near the central area, the hydraulic bag displacement is about one half of the seat displacement. Such an arrangement allows the use of a more efficient, compact hydraulic bag than would otherwise be possible.

As discussed above, prior art seat dampers are usually linear dampers. Large motions are allowed, because the dampers are often shock absorbers adapted from units designed for wheel suspension use. In contrast, the suspension system 10 of the preferred embodiment uses a damping scheme that provides damping forces that increase with the square of the velocity imparted to the damper. When adjusted for the prevailing road conditions, such damping is correct for a well-isolated ride. As such, large velocity, low frequency motions encountered when the truck finds rough roads generate large damping forces, effectively restraining large displacements of the seat 12 with respect to the cab floor 14. Such velocity-squared damping is provided by allowing the liquid to pass through the valve passageway 52 as the hydraulic bag is compressed or expanded. The valve 32 is perhaps the simplest of all flow restrictors. If the liquid is of small enough viscosity so that the fluid pressure losses are more greatly affected by the fluid kinetic energy than by the viscous shearing of the fluid orifice, then the damper force generated is proportional to the seat velocity squared. Such a low viscosity liquid is preferably an ethylene glycol/water mixture, which has the additional advantages of a low freezing point and the ability to protect against metal corrosion or damage to the rubber-fabric bag.

A short discussion of fluid dynamics may provide assistance in understanding how the present invention provides damping proportional to the square of the fluid velocity. In fluid flow, there are two common causes of pressure change: fluid kinetic energy and fluid viscosity. The kinetic energy of the fluid appears in the expression for the pressure needed to bring a particle or volume of fluid to a given velocity:

$$P=(\rho \times v^2)/2,$$

where:

P is the pressure to create a stream of velocity v;

ρ is the mass density of the fluid; and v is the velocity of the fluid.

As can be appreciated from the given equation, pressure changes in which losses of kinetic energy of the fluid are the controlling factor will have the fluid loss proportional to the square of the velocity of the fluid column.

The viscosity of the fluid causes a drop in pressure because of the rate of shear of the fluid:

$$P=33 \ \mu \times (v \times l/d^2),$$

where:

P is the pressure to slowly force a fluid through a conduit against only viscous resistance;

μ is the viscosity of the fluid;

d is the diameter of the conduit; and l is the length of the conduit.

As shown, the pressure drop changes according only to the first power of v, the fluid velocity.

To determine when kinetic energy is the determining factor in the fluid pressure drop, Osborne Reynolds in the 1800's divided the first expression by the second, obtaining a Reynolds number:

$$Nr=(V \times l)/(\mu/\rho),$$

where l is any typical dimension of a fluid flow system, typically the diameter for flow in a conduit. When the Reynolds number exceeds 3000, the flow of a fluid in the conduit is generally turbulent, indicating that kinetic energy has the upper hand. When the Reynolds number is below 2000, the flow in the conduit is always smooth, indicating that viscosity dominates. The value of Reynolds number depends on the choice of the diameter l and on the physical circumstances of the flow situation. Larger Reynolds numbers always indicate tendency toward a situation in which kinetic energy is dominant.

In the present invention, when the vehicle floor 14 is moving through a ¼ inch motion at one cycle per second, the passageway 52 through the valve 32 can be considered as a conduit 0.28 inches in diameter and 0.50 inches long, with proper damping. (In fact, it is not such a precise shape, but the general character of the flow is the same.) The Reynolds number for the fluid in that conduit is calculated to be 6200, well into the region where kinetic energy dominates. When the truck and the truck floor begin to move through larger excursions, the Reynolds number will only increase. Hence, the ability to rapidly increase damping forces with increasing stroke is confirmed.

An additional advantage of the suspension system 10 is that it provides superior isolation at frequencies higher than the natural frequencies. The spectral distribution of the vibration on the truck frame at such frequencies is important. Since the velocity during a truck frame vibration cycle decreases with frequency, the velocity-squared damping forces falls even faster. At ten times the natural frequency, the damper force is 1/100 as much as at the natural frequency. Good isolation of higher frequency vibrations is indeed obtained with the simple valve 32 and passageway 52. In fact, the vibration isolation of the suspension system 10 is better than with a linear damper. Further, vibration isolation provided by the valve is the same in both directions, which is desirable for the seat environment. Moreover, large motions bring large damping forces, which is most desirable for the seat suspension system 10, but not allowable for wheel suspensions.

Figure 4:
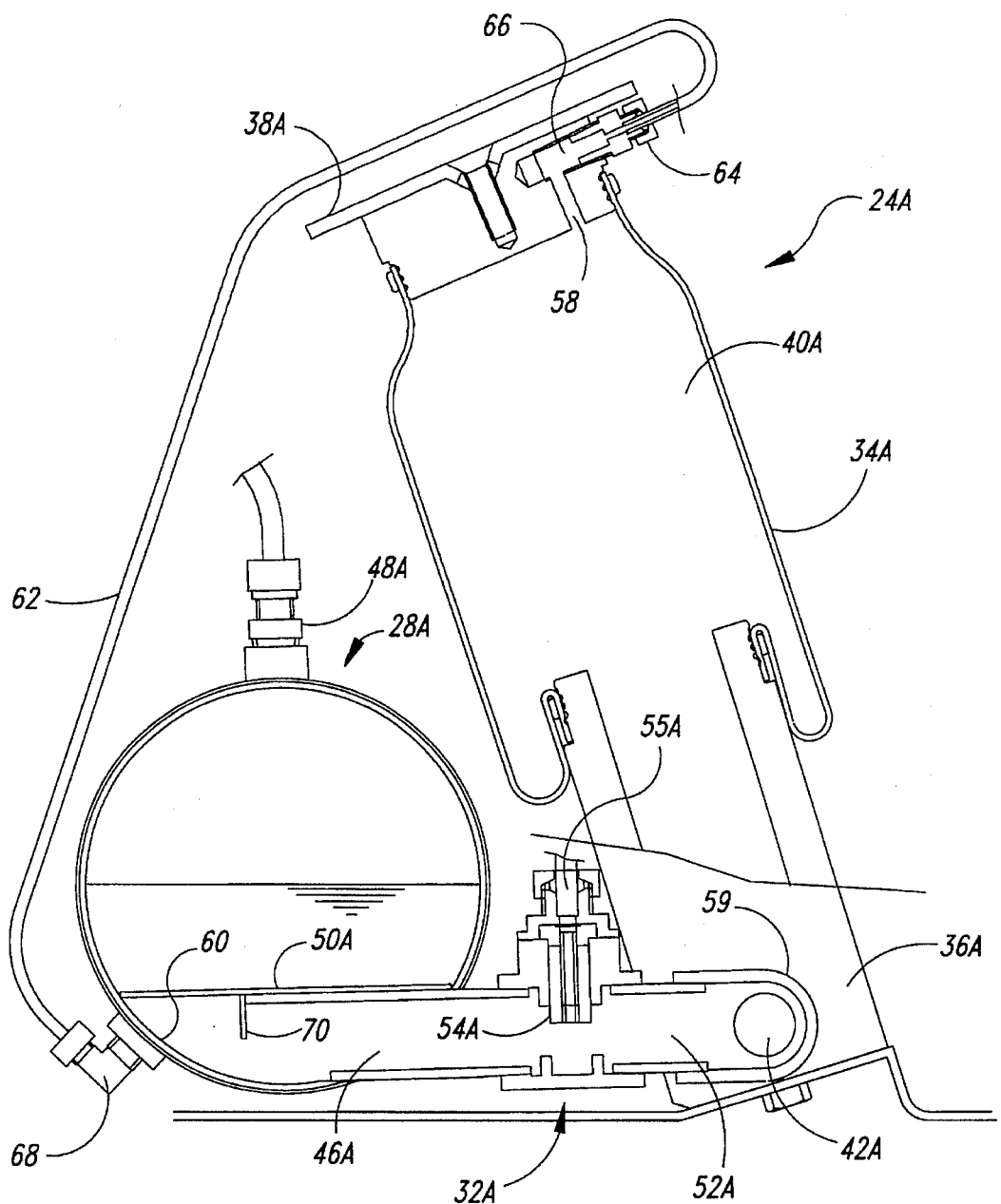
FIG. 4 is a cross-sectional view of an alternate suspension system supporting a seat on floor of a vehicle according to the present invention.

FIG. 4 shows an alternate embodiment of the seat suspension system according to the present invention. The alternate embodiment differs from the embodiment shown in FIGS. 1–3 in that the alternate embodiment includes a fluid reservoir 28A positioned beside a hydraulic bag 24A. A primary advantage of the alternate embodiment is that by arranging the fluid reservoir 28A beside the hydraulic bag 24A rather than on top of the hydraulic bag, the hydraulic bag can be made larger and still fit beneath the seat 12 of the vehicle. A larger hydraulic bag provides a more comfortable ride by using a longer stroke, i.e., a greater ratio between the fully compressed length of the hydraulic bag and the fully extended length of the hydraulic bag.

The alternate embodiment is similar in many respects to the embodiment shown in FIGS. 1–3. As such, elements of FIG. 4 that directly correspond to elements of FIG. 2 are given the same reference numbers except that an "A" is added to each reference number. Many of the elements of FIG. 4 are identical to those of FIG. 2, so the elements are discussed to the extent that they differ from corresponding elements of the embodiment shown in FIG. 2. Further, although the seat 12, link mechanism 16, seat base member 18 and u-shaped support shelf 26 shown in FIG. 3 are not shown in FIG. 4, it should be understood that the alternate embodiment employs the same elements.

One feature of the alternate embodiment shown in FIG. 4 that differs from the embodiment shown in FIG. 2 is the arrangement of the adjustable valve 32A. The internal chamber 40A of the hydraulic bag 24A communicates with the internal passageway 52A of the adjustable valve 32A via a threaded orifice 42A located in the rigid base 36A of the hydraulic bag. The adjustable valve includes an elbow joint 59 such that the internal passageway 52A makes a 90° turn to communicate with the threaded orifice 42A. (It should be appreciated that, because of the elbow joint 59, the cross-section of the reservoir 28A, the adjustable valve 32A, and the cross-section of the lower portion of the hydraulic bag 24A is taken at a different plane than the cross-section of the upper portion of the hydraulic bag 24A.) The internal passageway 52A of the adjustable valve 32A is substantially horizontal and communicates with the reservoir 28A via a lower valve orifice 46A in the reservoir. The adjustable valve 32A has a valve head 54A extending into the valve passageway to variably restrict the size of the passageway. The valve head 54A is connected by a valve stem 55A to a valve control handle 30A (FIG. 5) to enable users to manually control the position of the valve head 54A in the valve passageway 52A. As with the embodiment shown in FIG. 2, the manually controllable valve head 54A enables the user to alter the damping forces applied by the suspension system to adjust for the user's comfort preferences. Numerous well-known adjustable valves could be used, but in a preferred embodiment the adjustable valve 32A is a gate control valve. Such a gate control valve is a well-known, inexpensive valve that can be purchased in any hardware store.

To enable air to be vented from the hydraulic bag to the reservoir, the hydraulic bag includes a vent orifice 58 that communicates with a vent orifice 60 of the reservoir 28A via a vent line 62. A fitting 64 with an internal passageway 66 couples the vent line 62 to the vent orifice 56 of the hydraulic bag. Similarly, an appropriate fitting 68 couples the vent line 62 to the vent orifice 60 in the reservoir. Without such a venting system, air bubbles could get trapped in the hydraulic bag and detrimentally affect the operation of the hydraulic bag 24A. Preferably the internal diameter approximately 1/16 inch) of the vent line 62 is much smaller than the diameter of the internal passageway 52A (approximately 3/4 inch) of the control valve 32A, such that venting is provided without undue effect on the damping provided by the adjustable control valve.

Positioned within the reservoir 28A is a baffle 50A that is welded to the interior walls of the reservoir at a few locations along the perimeter of the baffle. As in the embodiment shown in FIG. 2, the baffle 50A is positioned above the orifice 46A coupled to the internal passageway 52A in the adjustable valve 32A to prevent the liquid from shooting up through the air in the reservoir, and possibly escaping through the valve port 48A. In addition, the baffle 50A includes a baffle extension 70 extending downward in front of the valve orifice 46A to direct the liquid from the valve 32A downwardly and to discourage ingestion of air into the valve 32A via the orifice 46A. Although the baffle 50A is shown as extending entirely across the reservoir 28A, the baffle 50A does not divide the reservoir 28A into separate chambers and does allow fluid 50 pass around the baffle.

Figure 5:
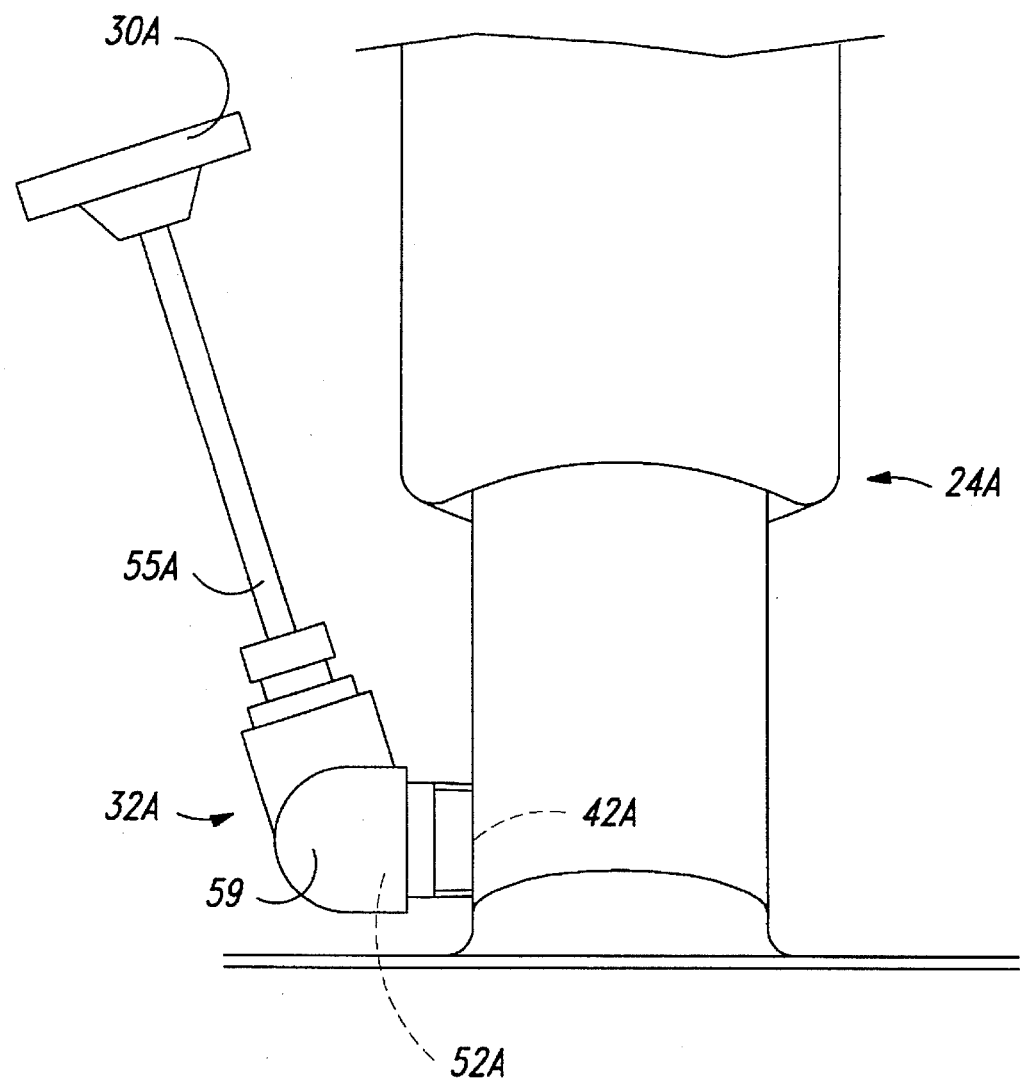
FIG. 5 is a rear elevational view of the alternate suspension system shown in FIG. 4.

Shown in FIG. 5 is a rear elevational view of the hydraulic bag 24A and the valve 32A of the embodiment shown in FIG. 4 (the reservoir is not shown to preserve the simplicity of FIG. 5). FIG. 5 more clearly shows the elbow joint 59 of the adjustable valve 32A. The elbow joint 59 extends right to left from the hydraulic bag and into the page of FIG. 5 to the reservoir 28A. The valve control handle 30A extends upwardly from the adjustable valve 32A to allow users of the vehicle to easily adjust the position of the valve head 54A in the valve passageway 52A and thereby control the damping of the seat suspension system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A shock absorbing suspension system supporting a seat on a floor of a vehicle, comprising:

a lower base member coupled to the floor;

an upper base member coupled to the seat;

a mechanism extending between the lower and upper base members, the mechanism being adapted to allow the lower and upper base members to move toward and away from each other and to restrict lateral motion of the upper base member with respect to the lower base member;

a hydraulic bag filled with a liquid and connected between the mechanism and the lower base member to support the upper base member and the seat, the hydraulic bag having an upper orifice;

a reservoir partially filled with liquid and having a lower orifice; and a flow restrictor supporting the reservoir on the hydraulic bag and having an internal passageway communicating with the hydraulic bag via its upper orifice and the reservoir via its lower orifice to allow the liquid from the hydraulic bag to pass into the reservoir, the passageway being sufficiently small to dampen motion of the upper base member toward and away from the lower base member; wherein the flow restrictor is adjustable to provide flow areas of the passageway intermediate a fully open position and a fully closed position and thereby change the ability of the flow restrictor to dampen the motion of the seat with respect to the floor.

2. The suspension system of claim 1 wherein the mechanism includes a pair of link arms pivotally connected to each other to form a pantograph structure.

3. The suspension system of claim 2, further comprising a support shelf connected between the hydraulic bag and one of the link arms to support the upper base member and the seat on the hydraulic bag.

4. The suspension system of claim 1 wherein the flow restrictor includes a control handle extending toward the front of the seat, the control handle being adapted to alter the flow area of the passageway.

5. The suspension system of claim 1, further including a supply of gas stored in the reservoir, wherein the liquid in the reservoir is in direct communication with the gas.

6. A shock absorbing suspension system supporting a seat on a floor of a vehicle, comprising:

a hydraulic bag supporting the seat on the floor and having an internal chamber filled with a liquid and an orifice in fluid communication with the chamber;

a reservoir coupled to the hydraulic chamber and having an orifice, the reservoir filled with a liquid layer and a gas layer, the liquid layer being in direct communication with and below the gas layer; and a restrictor having an internal passageway communicating with the hydraulic bag chamber via the hydraulic bag orifice and the reservoir via the reservoir orifice to allow the liquid from the hydraulic bag chamber to pass into the reservoir, the passageway being sufficiently small to dampen vertical motion of the seat with respect to the floor.

7. The suspension system of claim 6 wherein the flow restrictor passageway is of sufficiently large diameter and the liquid in the hydraulic bag is of sufficiently low viscosity so that fluid pressure losses are more greatly affected by the kinetic energy of the fluid than by viscous shearing of the fluid, thereby providing damping that is approximately proportional to the square of the velocity of the motion of the seat and floor with respect to each other.

8. The suspension system of claim 6, further including:

a link mechanism extending between the seat and floor, the link mechanism being adapted to allow vertical motion of the seat with respect to the floor and to restrict lateral motion of the seat with respect to the floor.

9. The suspension system of claim 8 wherein the link mechanism includes a pair of link arms pivotally connected to each other to form a pantograph structure.

10. The suspension system of claim 9, further comprising a support shelf connected between the hydraulic bag and one of the link arms to support the seat on the hydraulic bag.

11. The suspension system of claim 10 wherein the support shelf is connected to a central portion of one of the link arms such that the support shelf moves vertically less than the seat with respect to the floor.

12. The suspension system of claim 6 wherein the flow restrictor includes a valve that is adjustable to provide flow areas of the passageway intermediate a fully open position and a fully closed position and thereby change the ability of the valve to dampen the motion of the seat with respect to the floor.

13. The suspension system of claim 12 wherein the flow restrictor valve includes a control handle extending toward the front of the seat, the control handle being adapted to alter the flow area of the passageway.

14. The suspension system of claim 6 wherein the reservoir has an upper valve port and a baffle positioned adjacent the reservoir orifice, the baffle being adapted to impede the liquid from escaping, through the upper valve port when the upper valve port is opened.

15. The suspension system of claim 7 wherein the liquid is a non-corrosive mixture of water and ethylene glycol.

16. The suspension system of claim 6 wherein the reservoir is positioned beside the hydraulic bag, such that the internal passageway of the restrictor is substantially horizontal.

17. The suspension system of claim 6, further including a vent line communicating with the reservoir and the internal chamber of the hydraulic bag to allow gas to pass from the hydraulic bag to the reservoir.

18. A shock absorbing suspension system supporting a seat on a floor of a vehicle, comprising:

a hydraulic bag filled with a liquid and supporting the seat on the floor, the hydraulic bag having an upper orifice;

a reservoir positioned above, and being supported by, the hydraulic bag and having a lower orifice; and a valve supported by the hydraulic bag and having an internal passageway communicating with the hydraulic bag via its upper orifice and the reservoir via its lower orifice to allow the liquid from the hydraulic bag to pass into the reservoir, the passageway being sized to provide damping that is approximately proportional to the square of the velocity of the vertical motion of the seat and the floor with respect to each other.

19. The suspension system of claim 18, further including:

a link mechanism extending between the seat and floor, the link mechanism being adapted to allow vertical motion of the seat and floor with respect to each other and to restrict lateral motion of the seat with respect to the floor.

20. The suspension system of claim 19 wherein the link mechanism includes a pair of link arms pivotally connected to each other to form a pantograph structure.

21. The suspension system of claim 20, further comprising a support shelf connected between the hydraulic bag and one of the link arms to support the seat on the hydraulic bag.

22. The suspension system of claim 21 wherein the support shelf is connected to a central portion of one of the link arms such that the support shelf moves vertically less than the seat with respect to the floor.

23. The suspension system of claim 18 wherein the valve is adjustable to provide flow areas of the passageway intermediate a fully open position and a fully closed position and thereby change the ability of the valve to dampen the vertical motion of the seat and floor with respect to each other.

24. The suspension system of claim 18, further including supplies of liquid and gas stored in the reservoir, wherein the liquid in the reservoir is in direct communication with the gas.

25. The suspension system of claim 18 wherein the reservoir connects to an upper valve and has a baffle positioned adjacent the lower orifice to impede the liquid from escaping, through the upper valve when the upper valve is opened.

26. The suspension system of claim 18 wherein the valve passageway is of sufficiently large diameter and the liquid in the hydraulic bag is of sufficiently low viscosity so that fluid pressure losses are more greatly affected by the kinetic energy of the fluid than by viscous shearing of the fluid, thereby providing damping that is approximately proportional to the square of the velocity of the motion of the seat and floor with respect to each other.

27. A shock absorbing suspension system supporting a seat on a floor of a vehicle comprising:

a hydraulic bag supporting the seat on the floor and having an internal chamber filled with a liquid and first and second orifices in fluid communication with the chamber;

a reservoir positioned near the hydraulic bag and having first and second orifices, the reservoir being filled with a liquid layer and a gas layer, the liquid layer being in direct communication with and below the gas layer;

a valve having an internal passageway communicating with the hydraulic bag chamber via the hydraulic bag orifice and the reservoir, the internal passageway being sufficiently small to dampen vertical motion of the seat with respect to the floor; and a vent line coupled to the hydraulic bag second orifice and the reservoir second orifice to allow gas to pass from the hydraulic bag chamber to the reservoir.

28. The suspension system of claim 27 wherein the valve is manually adjustable to provide flow areas of the passageway intermediate a fully open position and a fully closed position and thereby change the ability of the valve to dampen the motion of the seat with respect to the floor.

29. The suspension system of claim 28, wherein the valve includes a control handle extending upward to a side of the seat, the control handle being coupled to alter the flow area of the passageway.

30. The suspension system of claim 27 wherein the valve passageway is substantially horizontal and the reservoir is beside the hydraulic bag.

31. The suspension system of claim 27 wherein the second orifice of the hydraulic bag is located at an upper portion of the chamber and the second orifice of the reservoir is located at a lower portion of the reservoir.

32. The suspension system of claim 27 wherein the valve passageway is of sufficiently large diameter and the liquid in the hydraulic bag is of sufficiently low viscosity so that fluid pressure losses are more greatly affected by the kinetic energy of the fluid than by viscous shearing of the fluid, thereby providing damping that is approximately proportional to the square of the velocity of the motion of the seat and the floor with respect to each other.

33. The suspension system of claim 27, further including:

a link mechanism extending between the seat and the floor, the link mechanism being adapted to allow vertical motion of the seat with respect to the floor and to restrict lateral motion of the seat with respect to the floor.

34. The suspension system of claim 33 wherein the link mechanism includes a pair of link arms pivotally connected to each other to form a pantograph structure.

35. The suspension system of claim 34, further comprising a support shelf connected between the hydraulic bag and at least one of the arms to support the seat on the hydraulic bag.

36. The suspension system of claim 35 wherein the support shelf is connected to a central portion of at least one of the link arms such that the support shelf moves vertically less than the seat with respect to the floor.

37. The suspension system of claim 27, wherein the reservoir has an upper valve port and a baffle positioned adjacent the reservoir's first orifice to impede the liquid from escaping through the upper valve port when the upper valve port is opened.

* * * * *